(12) United States Patent
Moustafa

(10) Patent No.: US 11,413,701 B1
(45) Date of Patent: Aug. 16, 2022

(54) VIBRATION-DAMPED ALUMINUM ARTICLE AND METHOD OF FORMING THE ARTICLE

(71) Applicant: King Abdulaziz University, Jeddah (SA)

(72) Inventor: Essam Bahgat Ezzat Moustafa, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/551,474

(22) Filed: Dec. 15, 2021

(51) Int. Cl.
*B23K 20/12* (2006.01)
*B23K 103/10* (2006.01)

(52) U.S. Cl.
CPC ........ *B23K 20/128* (2013.01); *B23K 2103/10* (2018.08)

(58) Field of Classification Search
None
See application file for complete search history.

(56) References Cited

U.S. PATENT DOCUMENTS

| | | | |
|---|---|---|---|
| 3,038,551 A | 6/1962 | McCoy et al. | |
| 4,783,300 A | 11/1988 | Grunwell | |
| 5,634,990 A | 6/1997 | Choi et al. | |
| 6,237,302 B1 | 5/2001 | Fricke | |
| 6,346,132 B1 | 2/2002 | Huber et al. | |
| 7,240,821 B2 * | 7/2007 | Tai | B23K 20/128 228/175 |
| 7,905,383 B1 * | 3/2011 | Torng | B23K 20/128 228/248.1 |
| 8,636,194 B2 | 1/2014 | Schultz et al. | |
| 10,837,945 B1 * | 11/2020 | Abushanab | B23K 31/125 |

(Continued)

FOREIGN PATENT DOCUMENTS

| CN | 110004387 A | 7/2019 | |
|---|---|---|---|
| CN | 110450476 A * | 11/2019 | B02C 17/10 |

(Continued)

OTHER PUBLICATIONS

Singh et al. (Effects of Al2O3 nanoparticles in friction stir welded nanocomposites), Nanocomposites, Jun. 2020, vol. 6, No. 2, p. 76-84 (Year: 2020).*

(Continued)

*Primary Examiner* — Devang R Patel
(74) *Attorney, Agent, or Firm* — Oblon, McClelland, Maier & Neustadt, L.L.P.

(57) ABSTRACT

A method of forming a vibration-damped aluminum article is provided. The method includes forming a groove in a surface of an aluminum substrate, the groove having a groove depth which is less than 50% of a thickness of the aluminum substrate. The method further includes placing metal oxide nanoparticles in the groove to form an unmixed composite. The method further includes friction stir processing the unmixed composite to form the vibration-damped aluminum article. The friction stir processing includes at least two passes over the unmixed composite. The vibration-damped aluminum article includes a surface nanocomposite portion and an aluminum alloy portion. The metal oxide nanoparticles are substantially free of metal carbides, metal borides, and carbon nanomaterials.

20 Claims, 13 Drawing Sheets

(56) References Cited

U.S. PATENT DOCUMENTS

| | | | |
|---|---|---|---|
| 2004/0050907 A1* | 3/2004 | Dracup | B23K 20/1255 |
| | | | 428/615 |
| 2008/0139722 A1 | 6/2008 | Shefelbine et al. | |
| 2013/0112039 A1 | 5/2013 | Hanna et al. | |
| 2020/0363375 A1* | 11/2020 | Abushanab | B23K 31/125 |

FOREIGN PATENT DOCUMENTS

| IN | 202141007370 A | 2/2021 |
|---|---|---|
| IN | 201941046380 A | 5/2021 |

OTHER PUBLICATIONS

Ceschini et al. (Tensile and fatigue properties of aluminum alloy composites), Composites Science and Technology, 2005, issue 66, p. 333-342 (Year: 2005).*

Tanvir Singh, et al., "Friction-stir welding of AA6061-T6: The effects of $Al_2O_3$ nano-particles addition", Results in Materials, vol. 1, Aug. 2019, 30 pages.

Sameer Mohammed, et al., "Friction Stir Welding of AA6082 Thin Aluminium Alloy Reinforced with $Al_2O_3$ Nanoparticles", Transactions of the Indian Ceramic Society, vol. 78, Issue 3, 2019, pp. 137-145 (Abstract only).

M. Ashjari, et al., "Experimental investigation on the effect of process environment on the mechanical properties of AA5083/$Al_2O_3$ nanocomposite fabricated via friction stir processing", Materials Science and Engineering: A, vol. 645, Oct. 1, 2015, pp. 40-46 (Abstract only).

* cited by examiner

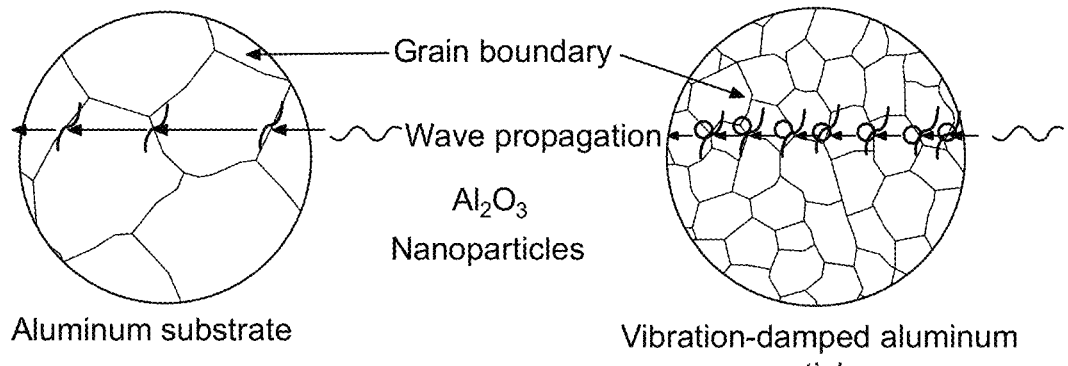
Aluminum substrate
FIG. 9A
Vibration-damped aluminum article
FIG. 9B
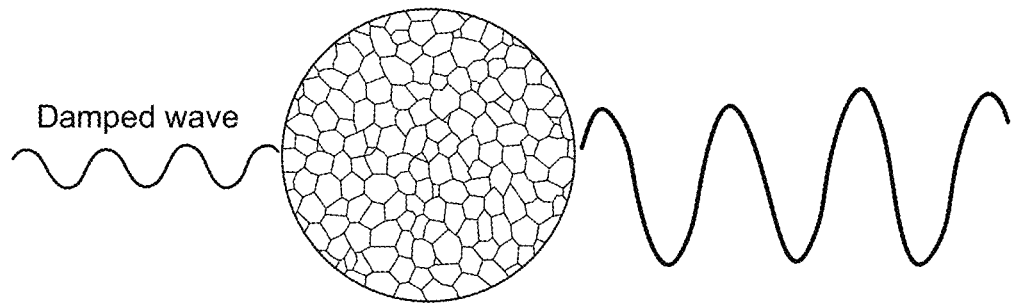
FIG. 9C

VIBRATION-DAMPED ALUMINUM ARTICLE AND METHOD OF FORMING THE ARTICLE

STATEMENT OF ACKNOWLEDGEMENT

This project was funded by Knowledge Economy & Technology Transfer Center, King Abdulaziz University, Jeddah, Saudi Arabia, Grant number 2020-067.

BACKGROUND

Technical Field

The present disclosure is directed to a vibration-damped aluminum article, and particularly, to a method of forming the vibration-damped aluminum article.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Aluminum and aluminum-based composites are among the most important materials used in vehicle, military, aerospace, and marine industries. Aluminum alloys in particular are desirable for their good mechanical properties, light weight, and corrosion resistance. Aluminum alloys are commonly used as components in applications that are exposed to high vibrational levels, such as an internal combustion engines, air frames, and motor base cylinder heads. It is crucial that such components when made of aluminum or aluminum alloys have controllable vibrational and other mechanical properties. In such applications, it may be advantageous for such a component to inhibit or damp vibrations.

An inner structure of a metal is made up of individual crystalline areas, otherwise referred to as the 'grains'. Grains of conventional aluminum alloys formed during a solidification process have large dimensions. Microstructures of conventional aluminum alloys and the corresponding grain sizes lead to a low damping capacity. Therefore, conventional aluminum alloys generate high vibrations and noise level signals which are transmitted to other linked structures. An average grain size of aluminum alloys has dimensions 150 to 280 micrometer (μm). Conventional methods have used modifier elements to refine the aluminum alloys up to 30 μm. Conventional friction stir processes (FSP) can refine grain size up to 5 μm. However, the conventional methods failed to achieve desired damping capacity. Hence, there is a need for a simple and a self-damped aluminum composite alloy which substantially reduces or eliminates the above limitations.

SUMMARY

The present disclosure relates to a method of forming a vibration-damped aluminum article. The method includes forming a groove in a surface of an aluminum substrate, the groove having a groove depth which is less than 50% of a thickness of the aluminum substrate. The method further includes placing metal oxide nanoparticles in the groove to form an unmixed composite. The method further includes friction stir processing the unmixed composite to form the vibration-damped aluminum article. The friction stir processing includes at least two passes over the unmixed composite. The vibration-damped aluminum article includes a surface nanocomposite portion and an aluminum alloy portion. The metal oxide nanoparticles are substantially free of metal carbides, metal borides, and carbon nanomaterials.

In some embodiments, the groove has a groove width which is equal to 75 to 125% of the groove depth.

In some embodiments, the aluminum substrate is constructed of an aluminum alloy selected from the group consisting of AA 7075, AA 2519, and AA 5083.

In some embodiments, the metal oxide nanoparticles are aluminum oxide ($Al_2O_3$) nanoparticles having a mean particle size of 5 to 150 nanometer (nm).

In some embodiments, the friction stir processing is performed at a rotation speed of 750 to 2000 rotations per minute (rpm) and a tool travel speed of 10 to 50 millimeter per minute (mm/min).

In some embodiments, the friction stir processing is performed with a friction stir processing tool having a shoulder diameter of 6 to 12 times the groove width, a pin diameter of 2 to 6 times the groove width, and a pin length of 2 to 6 times the groove depth.

In some embodiments, the method includes closing the groove before friction stir processing, the closing forming a closed groove including an enclosed channel filled with the metal oxide nanoparticles.

In some embodiments, the closing includes passing a pinless tool over the groove.

In some embodiments, the pinless tool has a pinless tool diameter of 6 to 12 times the groove width.

In some embodiments, the pinless tool is passed over the groove at a rotation speed of 750 to 2000 rpm and a tool travel speed of 10 to 50 mm/min.

In some embodiments, the surface nanocomposite portion includes the metal oxide nanoparticles and substantially equiaxed aluminum alloy grains having a mean grain size of 1 to 20 micrometer (μm).

In some embodiments, the surface nanocomposite portion includes one or more nanocomposite regions which collectively forms 5 to 100% of a surface area of the vibration-damped aluminum article, each of which has a nanocomposite region thickness of 75 to 200% of the groove depth.

In some embodiments, the metal oxide nanoparticles are present in an amount of 0.5 to 15 volume percent (vol %), based on a total volume of vibration-damped aluminum article. In some embodiments, the vibration-damped aluminum article has a damping ratio of 3.0 to 17.0%.

In some embodiments, the vibration-damped aluminum article has a loss factor of 0.06 to 0.30 and a loss modulus (E") of 4.0 to 9.0.

In another exemplary embodiment, a vibration-damped aluminum article is described. The vibration-damped aluminum article includes an aluminum alloy portion and a surface nanocomposite portion. The surface nanocomposite portion includes metal oxide nanoparticles having a mean particle size of 5 to 150 nm and substantially equiaxed aluminum alloy grains having a mean grain size of 1 to 20 μm. The metal oxide nanoparticles are substantially free of metal carbides, metal borides, and carbon nanomaterials. The vibration-damped aluminum article has a damping ratio of 3.0 to 17.0%, a loss factor of 0.06 to 0.30, and a loss modulus (E") of 4.0 to 9.0.

In some embodiments, the surface nanocomposite portion includes one or more nanocomposite regions which collectively forms 5 to 100% of a surface area of the vibration-damped aluminum article, each of which has a nanocomposite region thickness of 5 to 90% of a thickness of the vibration-damped aluminum article.

In some embodiments, the aluminum alloy is selected from the group consisting of AA 7075, AA 2519, and AA 5083.

In some embodiments, the metal oxide nanoparticles are present in an amount of 0.5 to 15 vol %, based on a total volume of vibration-damped aluminum article.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 9A-9C are schematic views showing a wave signal transmitting through the aluminum substrate and the vibration-damped aluminum article.

DETAILED DESCRIPTION

Figure 1:
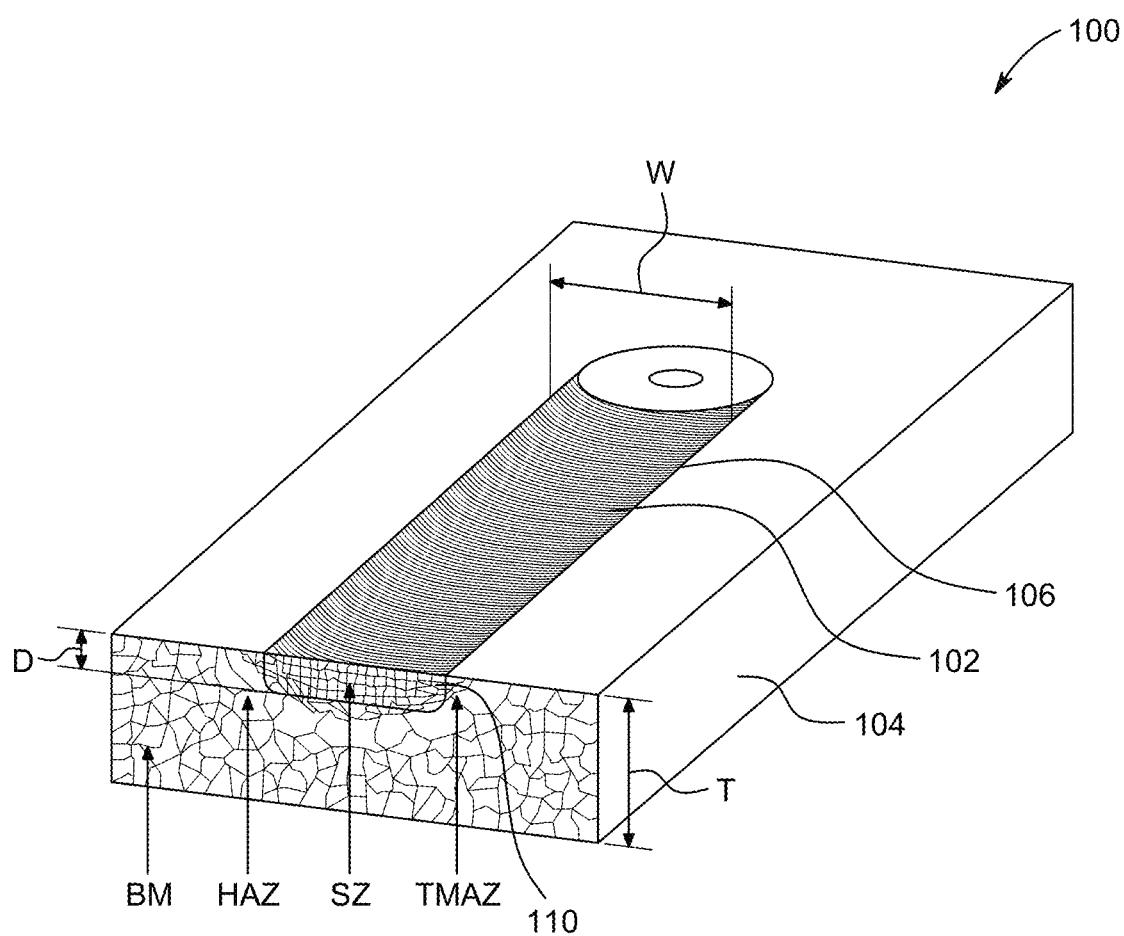
FIG. 1 is a schematic perspective view of a vibration-damped aluminum article showing a surface nanocomposite portion and an aluminum alloy portion, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

According to a first aspect, the present disclosure relates to a vibration-damped aluminum article. Referring to FIG. 1, a schematic perspective view of an exemplary vibration-damped aluminum article 100 is illustrated according to an embodiment of the present disclosure. The vibration-damped aluminum article 100 includes a surface nanocomposite portion 102 and an aluminum alloy portion 104. In some embodiments, the aluminum alloy portion 104 may refer to a volume of material defined by a base material, such as an aluminum alloy (otherwise referred to as an aluminum substrate), of the vibration-damped aluminum article 100 and the surface nanocomposite portion 102 may refer to a volume of material defined by the incorporation of metal oxide nanoparticles and substantially equiaxed aluminum alloy grains of the vibration-damped aluminum article 100. In an alternate embodiment, the aluminum alloy portion 104 may refer to a surface area defined by the base material of the vibration-damped aluminum article 100 and the surface nanocomposite portion 102 may refer to a surface area defined by the incorporation of metal oxide nanoparticles and the substantially equiaxed aluminum alloy grains of the vibration-damped aluminum article 100.

The nanocomposite region 106 may extend along a length of the vibration-damped aluminum article 100. The nanocomposite region 106 may alternatively extend along a width, a diagonal, another direction or dimension, or combination thereof of the vibration-damped aluminum article 100. As shown in the exemplary embodiment depicted in FIG. 1, the surface nanocomposite portion 102 may include one nanocomposite region 106. In some embodiments, the surface nanocomposite portion 102 may include two or more nanocomposite regions 106. Taken together, the nanocomposite regions 106 may collectively form 5 to 100% of a surface area of the vibration-damped aluminum article 100. Each nanocomposite region 106 has a nanocomposite region thickness of 5 to 90%, preferably 10 to 80%, preferably 15 to 75%, preferably 20 to 60%, preferably 25 to 55% of a thickness 'T' of the vibration-damped aluminum article 100. The thickness 'T' of the vibration-damped aluminum article 100 may be alternatively referred to as the thickness 'T' of the aluminum substrate. In embodiments having more than one nanocomposite region, each nanocomposite region may be substantially similar by some measure (e.g. having a similar thickness, width, length, volume, or other suitable measure). In some embodiments having more than one nanocomposite region, each nanocomposite region may not be substantially similar by one or more measure. For example, the vibration-damped aluminum article may have nanocomposite regions of different widths. In some embodiments, two nanocomposite regions may have a thickness which is a similar percentage of a thickness of the aluminum article in the area of the nanocomposite regions. For example, the vibration-damped aluminum article may have a first article region having a thickness of 10 mm and a second article region having a thickness of 5 mm. A first nanocomposite region located in the first article region may have a nanocomposite region thickness of 50% of the vibration-damped aluminum article thickness in the first region (5 mm). A second nanocomposite region located in the second article region may have a nanocomposite region thickness of 50% of the vibration-damped aluminum article thickness in the second region (2.5 mm). In this way, both nanocomposite regions have a similar thickness measured as a percentage of an article thickness (50%) but different special dimension (5 mm vs 2.5 mm). In some embodiments, two nanocomposite regions may have a thickness which is a similar spatial extent. Taking the previous example, both nanocomposite regions may be 2.5 mm, which would make the first nanocomposite region 25% of the vibration-damped aluminum article thickness in the first region and 50% of the vibration-damped aluminum article thickness in the second region. In some embodiments, each nanocomposite region may have a thickness which is a constant spatial extent throughout an entirety of the nanocomposite region. For example, a nanocomposite region may have a constant thickness of 1 mm, which makes up 10% of the vibration-damped aluminum article thickness in a region having a thickness of 10 mm but 25% of the vibration-damped aluminum article thickness in a region having a thickness of 4 mm. In some embodiments, each nanocomposite region may have a thickness which is a constant percentage of the vibration-damped aluminum article thickness throughout an entirety of the nanocomposite region. For example, a nanocomposite region may have a constant percentage thickness of 25% of the vibration-damped aluminum article thickness, where the spatial extent would be 2.5 mm in a region where the vibration-damped aluminum article thickness is 10 mm but 1 mm in a region where the vibration-damped aluminum article thickness is 4 mm. Each nanocomposite region may have a width which is constant or non-constant across an entirety of the nanocomposite region. For example, a nanocomposite region may be a line of constant width as depicted in FIG. 1 or may be a line which tapers or varies width in a regular or irregular fashion (e.g. waves, undulations, steps).

The metal oxide nanoparticles may be distributed throughout an entirety of the surface nanocomposite portion. Such a distribution may be homogeneous or non-homogeneous. In a homogeneous distribution, the metal oxide nanoparticles may be homogeneously distributed along grain boundaries. The metal oxide nanoparticles may not be present within the grains themselves. The lack of metal oxide nanoparticles within the grains themselves is not an indication of a non-homogeneous distribution. For example, the number of metal oxide nanoparticles may be substantially constant (e.g. within 10%, preferably within 5%, preferably within 1%) in a given volume (i.e. substantially the same as in any such given volume) of the nanocomposite portion comprising a plurality of grains. For example, any given cubic millimeter volume, preferably any given 0.5 cubic millimeter volume, preferably any given 0.25 cubic millimeter volume, preferably any given 0.1 cubic millimeter volume may contain substantially the same number of metal oxide particles. In, a non-homogeneous distribution the metal oxide nanoparticles may be non-homogeneously distributed along grain boundaries. Such a non-homogeneous distribution may involve clusters, clumps, aggregates, or other collections of metal oxide nanoparticles. Such collections may comprise individual metal oxide nanoparticles which are in contact but which retain distinct particulate identity. Such distinct particulate identity may mean that the particles are not sintered, fused, bound, melted, or otherwise irreversibly joined. Such collections may comprise metal oxide nanoparticles which have been irreversibly joined.

In some embodiments, the metal oxide nanoparticles are present in an amount of 0.5 to 15 volume percent (vol %), preferably 0.6 to 14 vol %, preferably 0.7 to 13 vol %, preferably 0.75 to 12 vol %, preferably 0.8 to 11 vol %, preferably 0.9 to 10.5 vol %, preferably 1 to 10 vol %, based on a total volume of the vibration-damped aluminum article 100.

In general, the aluminum alloy may be any suitable aluminum alloy known to one of ordinary skill in the art. It should be understood that in the context of the present disclosure, the term "aluminum alloy" includes aluminum itself substantially free of any alloying metals. In some embodiments, the aluminum alloy comprises at least one alloying metal. The alloying metal may be at least one selected from the group consisting of copper, silicon, iron, manganese, zinc, titanium, magnesium, lithium, cadmium, zirconium, beryllium, scandium, sodium, silicon, silver, calcium, nickel, bismuth, lead, chromium, vanadium, cobalt, germanium, gallium, and tin. To be considered an aluminum alloy, the material should comprise a majority aluminum by weight. That is, the material comprises at least 50.1 wt %, preferably at least 51 wt %, preferably at least 52.5 wt %, preferably at least 55 wt %, preferably at least 57.5 wt %, preferably at least 60 wt %, preferably at least 62.5 wt %, preferably at least 65 wt %, preferably at least 67.5 wt %, preferably at least 70 wt %, preferably at least 72.5 wt %, preferably at least 75 wt % aluminum based on a total weight of material.

In some embodiments, the aluminum alloy comprises 0.75 to 5.0 wt %, preferably 1.0 to 4.75 wt %, preferably 1.25 to 4.5 wt %, preferably 1.5 to 4.4 wt %, preferably 1.75 to 3.5 wt %, preferably 2.25 to 2.75 wt % magnesium. In some embodiments, the aluminum alloy comprises 0.01 to 1 wt %, preferably 0.05 to 0.8 wt %, preferably 0.09 to 0.70 wt % manganese. In some embodiments, the aluminum alloy comprises 0.75 to 5.0 wt %, preferably 1.0 to 4.4 wt %, preferably 1.25 to 3.5 wt %, preferably 1.5 to 1.75 wt % copper. In some embodiments, the aluminum alloy comprises 2.5 to 7.5 w %, preferably 3 to 7, preferably 4 to 6.75 wt %, preferably 4.5 to 6.5 wt %, preferably 5 to 6.25 wt %, preferably 5.75 to 6.0 wt %, preferably 5.85 to 5.90 wt % zinc. In some embodiments, the aluminum alloy comprises at least one selected from the group consisting of silicon, iron, copper, manganese, magnesium, chromium, nickel, zinc, and titanium. In some embodiments, the aluminum alloy comprises at least two selected from the above group. In some embodiments, the aluminum alloy comprises at least three selected from the above group. In some embodiments, the aluminum alloy comprises at least four selected from the above group. In some embodiments, the aluminum alloy comprises at least five selected from the above group. In some embodiments, the aluminum alloy comprises at least six selected from the above group. In some embodiments, the aluminum alloy comprises 0.75 to 5.0 wt %, preferably 1.0 to 4.75 wt %, preferably 1.25 to 4.5 wt %, preferably 1.5 to 4.4 wt %, preferably 1.75 to 3.5 wt %, preferably 2.25 to 2.75 wt % magnesium; 0.01 to 1 wt %, preferably 0.05 to 0.8 wt %, preferably 0.09 to 0.70 wt % manganese; 0.75 to 5.0 wt %, preferably 1.0 to 4.4 wt %, preferably 1.25 to 3.5 wt %, preferably 1.5 to 1.75 wt % copper; 2.5 to 7.5 w %, preferably 3 to 7, preferably 4 to 6.75 wt %, preferably 4.5 to 6.5 wt %, preferably 5 to 6.25 wt %, preferably 5.75 to 6.0 wt %, preferably 5.85 to 5.90 wt % zinc; 0.01 to 0.5 wt %, preferably 0.05 to 0.4 wt %, preferably 0.1 to 0.35 wt %, preferably 0.15 to 0.3 wt %, preferably 0.2 to 0.25 wt % iron; 0.01 to 0.5 wt %, preferably 0.05 to 0.4 wt %, preferably 0.1 to 0.3 wt %, preferably 0.15 to 0.25 wt %, preferably 0.175 to 0.225 wt % silicon; 0.01 to 0.5 wt %, preferably 0.05 to 0.4 wt %, preferably 0.1 to 0.3 wt %, preferably 0.15 to 0.25 wt %, preferably 0.175 to 0.225 wt % chromium; 0.001 to 0.01 wt %, preferably 0.002 to 0.009 wt %, preferably 0.003 to 0.007 wt %, preferably 0.004 to 0.006 wt % nickel; and 0.01 to 0.05, preferably 0.015 to 0.045 wt %, preferably 0.02 to 0.04, preferably 0.025 to 0.035 wt % titanium, with the balance being aluminum, each based on a total weight of aluminum alloy. In some embodiments, the aluminum alloy is selected from the group consisting of AA 7075, AA 2519, and AA 5083.

The metal oxide nanoparticles are substantially free of metal carbides, metal borides, and carbon nanomaterials. In some embodiments, the metal oxide nanoparticles have a mean particle size of 5 to 150 nanometer (nm), preferably 7.5 to 125 nm, preferably 10 to 100 nm, preferably 12.5 to 85 nm, preferably 15 to 75 nm, preferably 17.5 to 60 nm, preferably 20 to 50 nm, preferably 22.5 to 40 nm, preferably 25 to 35 nm, preferably 27.5 to 32.5 nm, preferably 30 nm. In some embodiments, the substantially equiaxed aluminum alloy grains having a mean grain size of 1 to 20 micrometer (μm), preferably 2 to 15 μm, preferably 3 to 12.5 μm, preferably 4 to 10 μm, preferably 4.5 to 9 μm, preferably 4.75 to 8 μm, preferably 5 to 7.5 μm. In some embodiments, the vibration-damped aluminum article 100 of the present disclosure has a damping ratio of 3.0 to 17.0%, preferably 4.0 to 16.75%, preferably 5.0 to 16.5%, preferably 6.0 to 16.0%, preferably 7.0 to 15.75%, preferably 8.0 to 15.5%, preferably 9.0 to 15.25%, preferably 10.0 to 15.0%, preferably 10.5 to 14.75%, preferably 11.0 to 14.5%, preferably 11.5 to 14.25%, preferably 12.0 to 14.0%. In some embodiments, the vibration-damped aluminum article has a loss factor of 0.06 to 0.30, preferably 0.08 to 0.29, preferably 0.10 to 0.28, preferably 0.12 to 0.27, preferably 0.14 to 0.26, preferably 0.16 to 0.25, preferably 0.18 to 0.245, preferably 0.20 to 0.24. In some embodiments, the vibration-damped aluminum article has a loss modulus (E″) of 4.0 to 9.0, preferably 4.1 to 8.5, preferably 4.25 to 8.0, preferably 4.5 to 7.5, preferably 4.75 to 7.0, preferably 5.0 to 6.5.

As shown in FIG. 1, the nanocomposite region 106 is defined by a groove 110 provided in the aluminum alloy. In one embodiment, cross-sectional shape of the groove 110 may be a square shape. In some embodiments, the cross-sectional shapes of the groove 110 may be, but not limited to, an oval shape, a polygonal shape, a rectangular shape, or other similar shape. The groove 110 has a groove depth 'D' which is less than 50%, preferably less than 49%, preferably less than 48%, preferably less than 47%, preferably less than 46%, preferably less than 45%, preferably less than 44%, preferably less than 43%, preferably less than 42%, preferably less than 41%, preferably less than 40%, preferably less than 39%, preferably less than 38%, preferably less than 37%, preferably less than 36%, preferably less than 35%, preferably less than 34% preferably less than 33%, preferably less than 32%, preferably less than 31%, preferably less than 30% of the thickness 'T' of the aluminum substrate. The groove 110 has a groove width 'W' which is equal to 75 to 125%, preferably 77.5 to 122.5%, preferably 80 to 120%, preferably 82.5 to 117.5%, preferably 85 to 115%, preferably 87.5 to 112.5%, preferably 90 to 110%, preferably 92.5 to 107.5%, preferably 95 to 105% of the groove depth 'D'. In one embodiment, the groove width 'W' of the groove 110 may be equal to 100% of the groove depth 'D'. Count of the groove 110, the groove width 'W', and the groove depth 'D' may vary depending on the thickness 'T' and other dimensional specifications of the aluminum substrate. In some embodiments, one groove is formed. In some embodiments, more than one groove is formed. In such embodiments, there is no upper limit to the number of grooves which may be formed. In such embodiments, the grooves may be formed in any suitable pattern. For example, the grooves may be formed as parallel lines, concentric circles, nested smooth waves, nested zig-zag lines, and the like. In some embodiments, the grooves, taken together may form 5 to 100%, 20 to 80%, or 40 to 60% of the surface area of a single flat side surface of the vibration-damped aluminum article.

Figure 2:
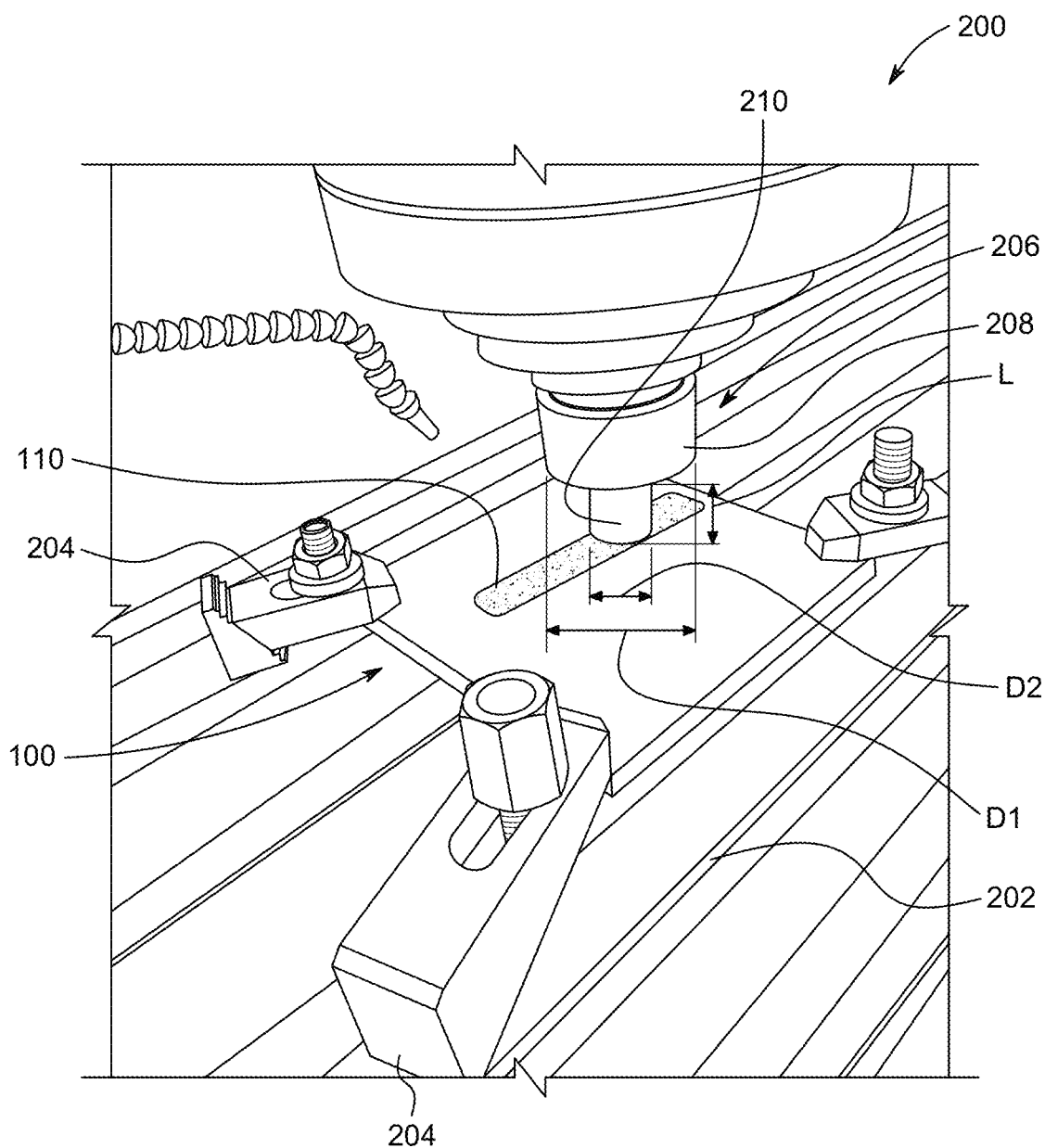
FIG. 2 is a perspective view showing fabrication of the vibration-damped aluminum article using a friction stir processing (FSP) tool, according to certain embodiments.

Referring to FIG. 2, a perspective view showing fabrication of the vibration-damped aluminum article 100 is illustrated. In an example, a milling machine 200 may be used to fabricate the vibration-damped aluminum article 100. The milling machine 200 includes a platform 202 having a plurality of fixtures 204 coupled therewith. The plurality of fixtures 204 may be configured to hold the metal substrate, alternatively referred to as the aluminum substrate, in a fixed position over the platform 202. The milling machine 200 is configured to perform friction stir processing (FSP) on the metal substrate to fabricate the vibration-damped aluminum article 100. The FSP is a machining process typically used for changing properties of a metal through a plastic deformation. The plastic deformation may be produced by inserting a tool into the metal and revolving the tool in a stirring motion. The tool is pushed laterally through the metal substrate. The FSP is generally used for a surface hardening process through microstructural modifications. The milling machine 200 used for the FSP may include a FSP tool 206. The FSP tool 206 includes a shoulder 208 having a shoulder diameter 'D1' and a pin 210 detachably coupled to the shoulder 208. The pin 210 may be snap-fitted to the shoulder 208. The pin 210 has a pin diameter 'D2' and a pin length 'L'.

Figure 3:
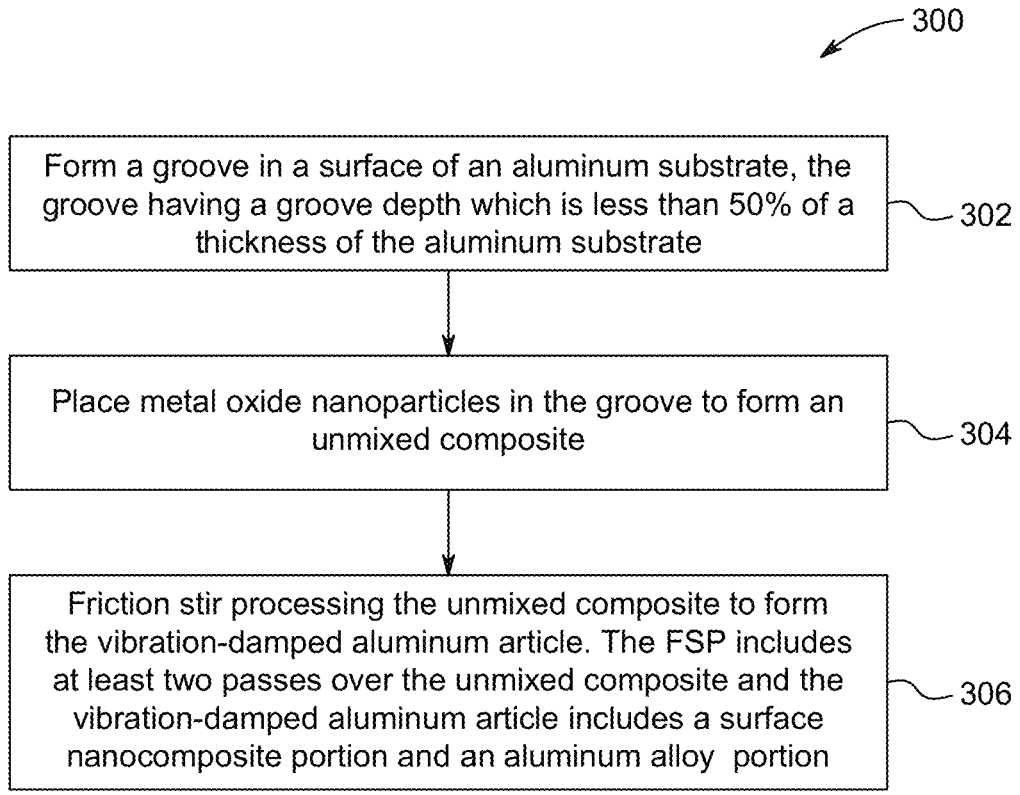
FIG. 3 is a schematic flow diagram of a method of forming the vibration-damped aluminum article, according to certain embodiments.

Referring to FIG. 3, a schematic flow diagram of a method 300 of forming the vibration-damped aluminum article 100 is illustrated. The method 300 is described with reference to the vibration-damped aluminum article 100 and the fabrication thereof illustrated in FIG. 1 and FIG. 2, respectively. The order in which the method 300 is described is not intended to be construed as a limitation, and any number of the described method steps can be combined in any order to implement the method 300. In an embodiment, the method 300 may be executed by the milling machine 200 of the present disclosure.

At step 302, the method 300 includes forming the groove 110 in a surface of the aluminum substrate. The aluminum substrate may be an aluminum alloy as described above. In preferred embodiments, the aluminum substrate is constructed or formed of an aluminum alloy preferably selected from the group consisting of aluminum alloy AA 7075, AA 2519, and AA 5083. The aluminum substrate may be constructed or formed by any suitable technique known to one of ordinary skill in the art. Examples of such techniques include, but are not limited to casting, extruding, molding, milling, machining, and the like. The groove may be designed by a computer numerical control (CNC) machine. The CNC machine may be used for performing various machining operations including, but not limited to, milling, drilling, grinding, and cutting.

In general, the groove may be formed by any suitable method or with any suitable equipment known to one of ordinary skill in the art. For example, the groove may be formed by drilling. In another example, the groove may be formed by grinding. In another example, the groove may be formed by broaching, such as surface broaching. Broaching refers to a machining process which involves the use of a toothed tool called a broach. The broaching may involve movement of the broach across a surface of the aluminum substrate or movement of the aluminum substrate against a stationary broach. In another example, the groove may be formed by milling. Milling involves the use of one or more rotary cutters to remove material from an article. The milling may be any suitable type of milling. The milling may be a linear tool path milling or a nonlinear tool path milling. The milling may involve the use of any suitable milling cutter, for example an end mill, a ball cutter, a slab mill, a face mill, a fly cutter, and a shell mill. The milling may be performed with a computer numerical control (CNC) machine as described above. A method which involves fitting an appropriate cutting tool or cutting head into the milling machine used in the FSP process would be considered milling. In another example, the groove may be formed by engraving. Engraving refers to cutting using a tool which does not rotate. The engraving may be performed using a computer as in computer-aided machine engraving. The term "engraving" is sometimes used to refer to similar methods which do not use a physical tool, such as laser engraving or photo engraving. In another example, the groove may be formed by photochemical machining. In another example, the groove may be formed by cutting. The cutting may be any suitable type of cutting, such as mechanical cutting, water jet cutting, abrasive jet cutting, laser cutting, and plasma cutting. In another example, the groove may be formed by electrical discharge machining (also known as spark machining, spark eroding, die sinking, wire burning or wire erosion). In another example, the groove may be formed by electron-beam machining. Electron-beam machining refers to a process where high-velocity electrons concentrated into a narrow beam that are directed towards the work piece, creating heat and vaporizing the material. In another example, the groove may be formed by ultrasonic machining.

The groove 110 has the groove depth 'D' which is less than 50%, preferably less than 49%, preferably less than 48%, preferably less than 47%, preferably less than 46%, preferably less than 45%, preferably less than 44%, preferably less than 43%, preferably less than 42%, preferably less than 41%, preferably less than 40%, preferably less than 39%, preferably less than 38%, preferably less than 37%, preferably less than 36%, preferably less than 35%, preferably less than 34% preferably less than 33%, preferably less than 32%, preferably less than 31%, preferably less than 30% of the thickness 'T' of the aluminum substrate. The groove 110 has the groove width 'W' which is equal to 75 to 125%, preferably 77.5 to 122.5%, preferably 80 to 120%, preferably 82.5 to 117.5%, preferably 85 to 115%, preferably 87.5 to 112.5%, preferably 90 to 110%, preferably 92.5 to 107.5%, preferably 95 to 105% of the groove depth 'D'. In one embodiment, the groove 110 has the groove width 'W' which is equal to 100% of the groove depth 'D'.

At step 304, the method 300 includes placing the metal oxide nanoparticles in the groove 110 to form an unmixed composite. The metal oxide nanoparticles may be placed in the groove 110 by any suitable technique known to one of ordinary skill in the art. For example, the metal oxide nanoparticles may be placed in the grove manually, by using hand tools, or by using automated equipment. The metal oxide nanoparticles may be placed in the groove by pouring, flowing, dispensing, or other suitable method in which the metal oxide nanoparticles are placed in the groove under the action of gravity. The metal oxide nanoparticles may be placed in the groove by forcing, compacting, spraying, packing, or other suitable method in which the metal oxide nanoparticles are placed into the groove under the action of a force other than gravity. In some embodiments, the metal oxide nanoparticles are pressed, compacted, compressed, or otherwise subjected to an external force after being placed into the groove.

In some embodiments, the metal oxide nanoparticles are present in the amount of 0.5 to 15 vol %, 0.5 to 15 volume percent (vol %), preferably 0.6 to 14 vol %, preferably 0.7 to 13 vol %, preferably 0.75 to 12 vol %, preferably 0.8 to 11 vol %, preferably 0.9 to 10.5 vol %, preferably 1 to 10 vol % based on the total volume of the vibration-damped aluminum article 100. In some embodiments, the metal oxide nanoparticles are substantially free of metal carbides, metal borides, and carbon nanomaterials. In the present disclosure, the metal substrate and the metal oxide nanoparticles are made of aluminum. In one embodiment, the metal oxide nanoparticles are aluminum oxide ($Al_2O_3$) nanoparticles having the mean particle size of 5 to 150 nm, preferably 7.5 to 125 nm, preferably 10 to 100 nm, preferably 12.5 to 85 nm, preferably 15 to 75 nm, preferably 17.5 to 60 nm, preferably 20 to 50 nm, preferably 22.5 to 40 nm, preferably 25 to 35 nm, preferably 27.5 to 32.5 nm, preferably 30 nm.

In general, the aluminum oxide nanoparticles can be any shape known to one of ordinary skill in the art. Examples of suitable shapes the aluminum oxide nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For aluminum oxide nanoparticles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the aluminum oxide nanoparticles are envisioned as having in any embodiments.

In some embodiments, the aluminum oxide nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of aluminum oxide nanoparticles having a different shape. As used herein, the term "non-uniform shape" refers to an average consistent shape that differs by more than 10% of the distribution of aluminum oxide nanoparticles having a different shape. In one embodiment, the shape is uniform and at least 90% of the aluminum oxide nanoparticles are spherical or substantially circular, and less than 10% are polygonal. In another embodiment, the shape is non-uniform and less than 90% of the aluminum oxide nanoparticles are spherical or substantially circular, and greater than 10% are polygonal.

In some embodiments, the aluminum oxide nanoparticles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the aluminum oxide nanoparticles of the present disclosure are monodisperse having a particle size distribution ranging from 80% of the average particle size to 120% of the average particle size, preferably 90-110%, preferably 95-105% of the average particle size. In some embodiments, the aluminum oxide nanoparticles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

The aluminum oxide may be any polymorph or phase of aluminum oxide. In some embodiments, the aluminum oxide is amorphous aluminum oxide. In some embodiments, the aluminum oxide is crystalline aluminum oxide. The crystalline aluminum oxide may adopt any suitable crystal structure or be any suitable phase of aluminum oxide. Examples of such phases include $\alpha$-$Al_2O_3$, $\chi$-$Al_2O_3$, $\eta$-$Al_2O_3$, $\delta$-$Al_2O_3$, $\kappa$-$Al_2O_3$, $\theta$-$Al_2O_3$, $\gamma$-$Al_2O_3$, $\rho$-$Al_2O_3$, and $\beta$-$Al_2O_3$. In some embodiments, the aluminum oxide nanoparticles are $\alpha$-$Al_2O_3$.

In an embodiment, the method 300 further comprises closing the groove 110 before the friction stir processing is initiated. When the closing operation is performed, a closed groove is formed in the aluminum substrate which includes an enclosed channel filled with the metal oxide nanoparticles. The enclosed channel may prevent the metal oxide nanoparticles from being spread out during the FSP. In some embodiments, the method 300 of closing the groove 110 includes passing a pinless tool over the groove 110. In one embodiment, the pinless tool may be allowed to travel along a length of the groove 110 only once, which may be otherwise referred to as 'one pass'. In some embodiments, the method 300 of closing may include passing the pinless tool over the groove 110 multiple times, in other words more than one pass. In one example, the pinless tool may be similar to the FSP tool 206 having the shoulder 208, but without the pin 210. In another example, the pinless tool may be different from the FSP tool 206. The pinless tool has a pinless tool diameter of 6 to 12, preferably 6.5 to 11.5, preferably 7 to 11, preferably 7.5 to 10.5, preferably 8 to 10, preferably 8.5 to 9.5 times the groove width 'W'. During the closing operation, the pinless tool is passed over the groove 110 at a rotation speed of 750 to 2000, preferably 800 to 1750, preferably 850 to 1500, preferably 875 to 1250, preferably 900 to 1100 rotations per minute (rpm) and a tool travel speed of 10 to 50, preferably 15 to 45, preferably 20 to 40, preferably 25 to 35, preferably 27.5 to 32.5, preferably 30 mm/min millimeter per minute (mm/min).

At step 306, the method 300 includes friction stir processing the unmixed composite to form the vibration-damped aluminum article 100. The friction stir processing includes at least two passes over the unmixed composite. A pass may be defined as a travel of the FSP tool 206 over the unmixed composite along the length of the groove 110. In the present disclosure, the friction stir processing includes three passes, namely a first pass, a second pass, and a third pass, over the unmixed composite. Three passes of the FSP are otherwise referred to as the multi-pass FSP. The number of passes may be defined based on a desired surface finish of the vibration-damped aluminum article 100. The friction stir processing is performed with the FSP tool 206 having the shoulder diameter 'D1' of 6 to 12, preferably 6.5 to 11.5, preferably 7 to 11, preferably 7.5 to 10.5, preferably 8 to 10, preferably 8.5 to 9.5 times the groove width 'W', the pin diameter 'D2' of 2 to 6, preferably 2.25 to 5.75, preferably 2.5 to 5.5, preferably 2.75 to 5.25, preferably 3.0 to 5.0, preferably 3.25 to 4.75, preferably 3.5 to 4.5, preferably 3.75 to 4.25 times the groove width 'W', and the pin length 'L' of 2 to 6, preferably 2.25 to 5.75, preferably 2.5 to 5.5, preferably 2.75 to 5.25, preferably 3.0 to 5.0, preferably 3.25 to 4.75, preferably 3.5 to 4.5, preferably 3.75 to 4.25 times the groove depth 'D'. The friction stir processing is further performed at a rotation speed of 750 to 2000 rpm, preferably 800 to 1750, preferably 850 to 1500, preferably 875 to 1250, preferably 900 to 1100 rpm and a tool travel speed of 10 to 50, preferably 15 to 45, preferably 20 to 40, preferably 25 to 35, preferably 27.5 to 32.5, preferably 30 mm/min. In one embodiment, the rotation speed and the tool travel speed of the FSP tool 206 may be maintained to remain consistent for each pass. In some embodiments, the rotation speed and the tool travel speed of the FSP tool 206 may be varied for each pass based on the desired surface finish of the vibration-damped aluminum article 100. In some embodiments, the vibration-damped aluminum article 100 has the damping ratio of 3.0 to 17.0%, preferably 4.0 to 16.75%, preferably 5.0 to 16.5%, preferably 6.0 to 16.0%, preferably 7.0 to 15.75%, preferably 8.0 to 15.5%, preferably 9.0 to 15.25%, preferably 10.0 to 15.0%, preferably 10.5 to 14.75%, preferably 11.0 to 14.5%, preferably 11.5 to 14.25%, preferably 12.0 to 14.0%. In some embodiments, the vibration-damped aluminum article has a loss factor of 0.06 to 0.30, preferably 0.08 to 0.29, preferably 0.10 to 0.28, preferably 0.12 to 0.27, preferably 0.14 to 0.26, preferably 0.16 to 0.25, preferably 0.18 to 0.245, preferably 0.20 to 0.24. In some embodiments, the vibration-damped aluminum article has a loss modulus (E") of 4.0 to 9.0, preferably 4.1 to 8.5, preferably 4.25 to 8.0, preferably 4.5 to 7.5, preferably 4.75 to 7.0, preferably 5.0 to 6.5.

During the friction stir processing, the FSP tool 206 is preferably aligned with a centre line of the groove 110 that is filled with the $Al_2O_3$ nanoparticles in the aluminium substrate. When the FSP tool 206 rotates, stirring action of the pin 210 forces a mixture such as a portion of the aluminium substrate and the $Al_2O_3$ nanoparticles to flow around the pin 210. On traverse motion of the FSP tool 206, the mixture flows to back of the pin 210, causing plastic deformation in the aluminium substrate. The mixture is further exposed to breaking and redistribution of grains. The grains are crystalline areas which form an inner structure of a metal or an alloy (such as the aluminium substrate in the present disclosure).

As shown in FIG. 1, the vibration-damped aluminum article 100 includes the surface nanocomposite portion 102 and the aluminum alloy portion 104. The vibration-damped aluminum article 100 further includes a plurality of zones. The plurality of zones includes a nugget zone (NZ, also known as the stir zone or stirred zone SZ), a thermo-mechanical affected zone (TMAZ), a heat-affected zone (HAZ), and a base material (BM) or the aluminum alloy portion 104. The nugget zone (NZ) is the central zone where intermixing of the metal oxide nanoparticles and the portion of the aluminum substrate takes place. In some embodiments, the surface nanocomposite portion 102 may include the NZ. In some embodiments, clusters of the $Al_2O_3$ nanoparticles may be formed at a nugget zone (NZ) in the first pass of the FSP tool 206. The clusters of the $Al_2O_3$ nanoparticles may be shattered and well distributed in the second and the third passes of the FSP tool 206. The TMAZ is present in a transition region between the BM and the NZ. The TMAZ is the zone of maximum deformation formed without intermixing. In an alternate embodiment, the surface nanocomposite portion 102 may also include a portion of the TMAZ. The HAZ is a region present beyond the TMAZ. The HAZ experiences temperature variations without the plastic deformation. The surface nanocomposite portion 102 may exclude the HAZ.

The surface nanocomposite portion 102 includes the metal oxide nanoparticles and the substantially equiaxed aluminum alloy grains having the mean grain size of 1 to 20 µm, preferably 2 to 15 µm, preferably 3 to 12.5 µm, preferably 4 to 10 µm, preferably 4.5 to 9 µm, preferably 4.75 to 8 µm, preferably 5 to 7.5 µm. The surface nanocomposite portion 102 further includes the metal oxide nanoparticles having the mean particle size of 5 to 150 nm, preferably 7.5 to 125 nm, preferably 10 to 100 nm, preferably 12.5 to 85 nm, preferably 15 to 75 nm, preferably 17.5 to 60 nm, preferably 20 to 50 nm, preferably 22.5 to 40 nm, preferably 25 to 35 nm, preferably 27.5 to 32.5 nm, preferably 30 nm. In some embodiments, the mean particle size of the metal oxide nanoparticles of the surface nanocomposite portion 102 may or may not vary with a mean particle size of the metal oxide nanoparticles forming the unmixed composite. In one embodiment, the surface nanocomposite portion 102 includes the one or more nanocomposite regions 106 which collectively forms 5 to 100% of the surface area of the vibration-damped aluminum article 100, each of which has the nanocomposite region thickness of 75 to 200% of the groove depth 'D'. In an alternate embodiment, each nanocomposite region has the nanocomposite region thickness of 5 to 90%, preferably 10 to 80%, preferably 15 to 75%, preferably 20 to 60%, preferably 25 to 55% of the thickness 'T' of the vibration-damped aluminum article 100.

The examples below are intended to further illustrate protocols for preparing, testing, and characterizing the vibration damped aluminum article of the present invention and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present disclosure are possible in light of the above teachings. It is therefore to be understood that within the scope of the appended claims, the invention may be practiced otherwise than as specifically described herein.

EXAMPLES

The following examples describe and demonstrate exemplary embodiments of the vibration-damped aluminum articles described herein. The examples are provided solely for the purpose of illustration and are not to be construed as limitations of the present disclosure, as many variations thereof are possible without departing from the spirit and scope of the present disclosure. The FSP is used to form the vibration-damped aluminum articles by using the FSP tool.

Example 1

AA 7075 was used as the aluminum substrate. The AA 7075 was used as a plate having dimensions such as length, width and height of 150 mm×150 mm×10 mm, respectively. The chemical composition (in mass fraction percentage) of the aluminum substrate was 0.2% silicon, 0.21% iron, 1.57% copper, 0.09% manganese, 2.55% magnesium, 0.19% chromium, 0.005% nickel, 5.89% zinc, 0.03% titanium, and 89.26% aluminum. The metal oxide nanoparticles $Al_2O_3$ were placed in the groove formed by a CNC milling machine. The groove depth 'D' and the groove width 'W' were the same at 3 mm. Hence, the groove width 'W' was 100% equal to that of the groove depth 'D'. The pinless tool was used to close the groove before the FSP. The FSP was performed at a rotation speed of 1080 rpm and a tool travel speed of 30 mm/min.

Example 2

AA 2024 was used as the aluminum substrate under similar conditions as Example 1 above.

Example 3

Damping Measurement

A free vibration impact test was carried out on the aluminum substrate before FSP and the vibration-damped aluminum article. A special fixture was designed to hold the aluminum substrate and the vibration-damped aluminum article as cantilever beams to measure the impact of damage on dynamic properties, such as a storage modulus and a loss factor. Vibration signals were picked up by two Constant Current Line Drive (CCLD) accelerometers (Type 4507-B, Bruel & Kjaer, Naeuram, Denmark). Hence, the CCLD accelerometers were supported on a Carbon Fiber-Reinforced-Polymer (CFRP) plate by mounting clips. An acoustic signal was picked up by one microphone (Type 4188, Bruel & Kjaer, Naeuram, Denmark), which is 5 mm distant from the CFRP plate. Excitation was initiated using an impact hammer with a force transducer (Type 8206, Bruel & Kjaer, Naeuram, Denmark). Acoustic and vibration signals were acquired and processed using a Local Area Network (LAN-XI PULSE) analyzer (Type 3050 A-60, Bruel & Kjaer, Naeuram, Denmark). A Fast Fourier transform (FFT) was performed using a 3,200-line resolution and a frequency span of 10 Kilohertz (kHz). Ten data blocks were set to be averaged using a linear averaging mode. Ten trial impacts were also performed for each test to obtain correct averaged data. The data was analyzed via a MEscope software (Vibrant Technology, Centennial, USA).

Example 4

Macrostructue Observation

Figure 4A:
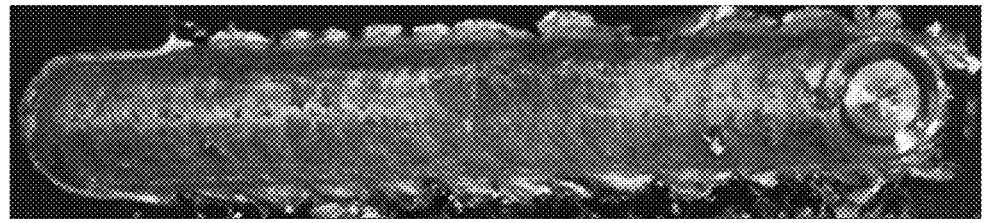
FIGS. 4A-4C are top views of the vibration-damped aluminum article showing nanocomposite portions processed with a first pass, a second pass, and a third pass, respectively, of the fabrication process using the FSP tool.
Figure 4B:
Figure 4C:

Referring to FIG. 4A-4C, top views of the vibration-damped aluminum article showing nanocomposite portions processed with the first pass, the second pass, and the third pass, respectively, of the fabrication process using the FSP tool are illustrated. The multi-pass FSP was made over the unmixed composite. The multi-pass FSP produced a homogenous/uniform distribution of the $Al_2O_3$ nanoparticles inside the AA 7075 and refinement of grains of the vibration-damped aluminum article. Further, the multi-pass FSP increased the quality/hardness of the vibration-damped aluminum article. The first pass provided the surface finish with few surface defects (FIG. 4A). However, the second and third passes provided the finest surface finish excluding all the surface defects leading to plain surfaces (FIGS. 4B & 4C).

Example 5

Microstructure Observation

Referring to FIGS. 5A-5D, Scanning Electron Microscope (SEM) micrographs of the microstructure of an AA 7075 aluminum substrate and the vibration-damped aluminum article processed with the first pass, the second pass, and the third pass, respectively, of the fabrication process are illustrated. The AA 7075 sample exhibited elongated non-recrystallized coarse grains before FSP (shown in FIG. 5A). Friction and the plastic deformations caused by the FSP lead to heating of the SZ to form a dynamically recrystallized (DRX) structure. Hence, the SZ included more uniform equiaxed refined grains than grains present in the BM. In the TMAZ, AA 7075 elongated grains were deformed in an upward flowing pattern around the NZ. The heat-affected zone (HAZ) beyond the TMAZ went through thermal cycling, but did not go through any plastic deformation, so the grain structure of the HAZ remained the same with respect to the grains of the BM.

Figure 5A:
FIGS. 5A-5D are Scanning Electron Microscope (SEM) micrographs of a microstructure of an aluminum substrate and stirred zones (SZ) of the vibration-damped aluminum article processed with the first pass, the second pass, and the third pass, respectively, of the fabrication process.
Figure 5B:
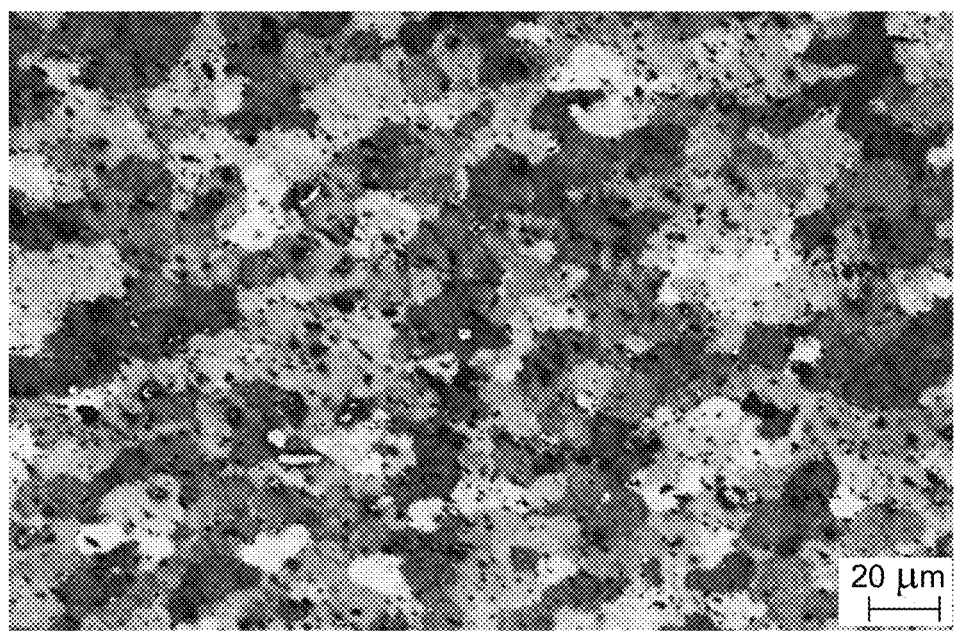
Figure 5C:
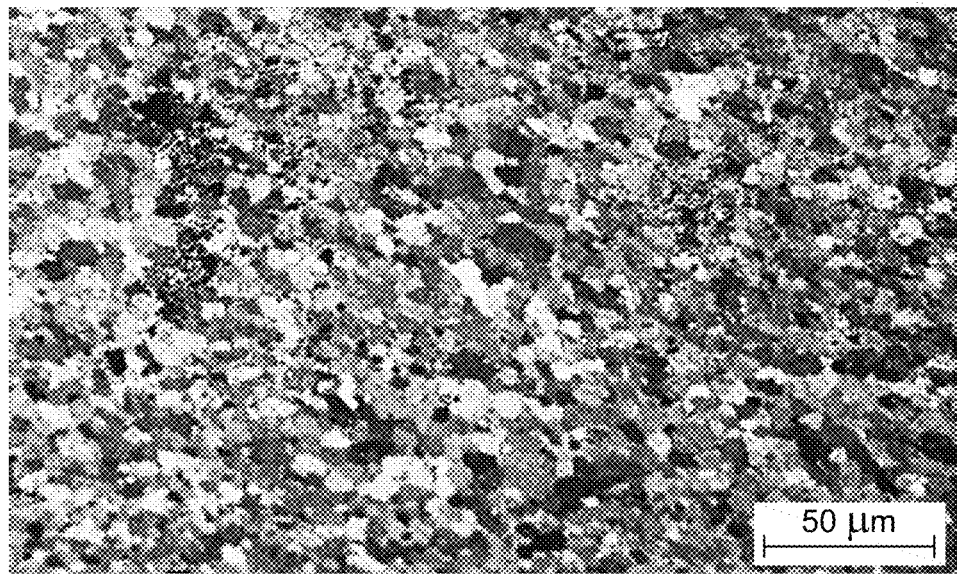
Figure 5D:
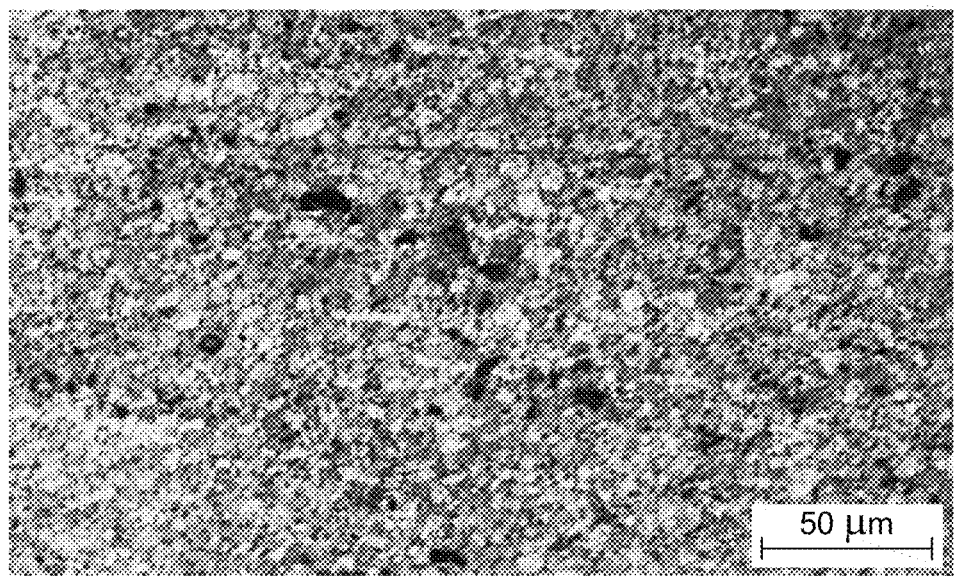
Figure 6A:
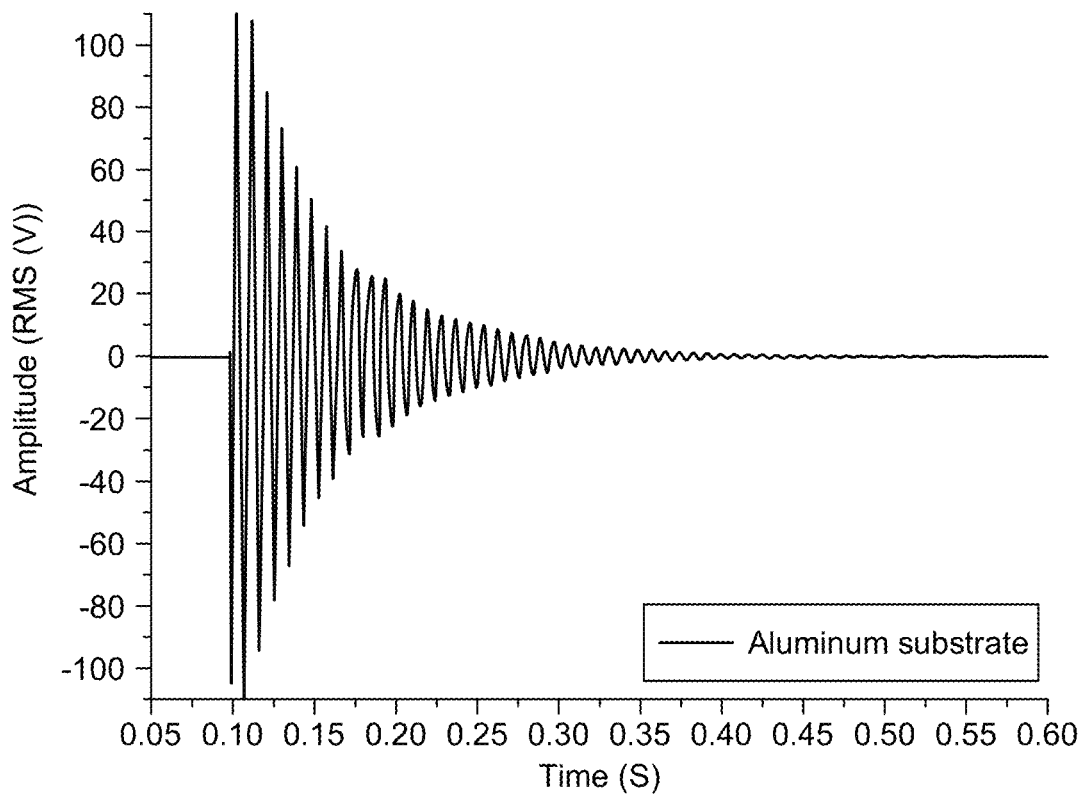
FIGS. 6A-6D are graphical representations of decay times of the aluminum substrate and the vibration-damped aluminum article with the first pass, the second pass, and the third pass, respectively, of the fabrication process.
Figure 6B:
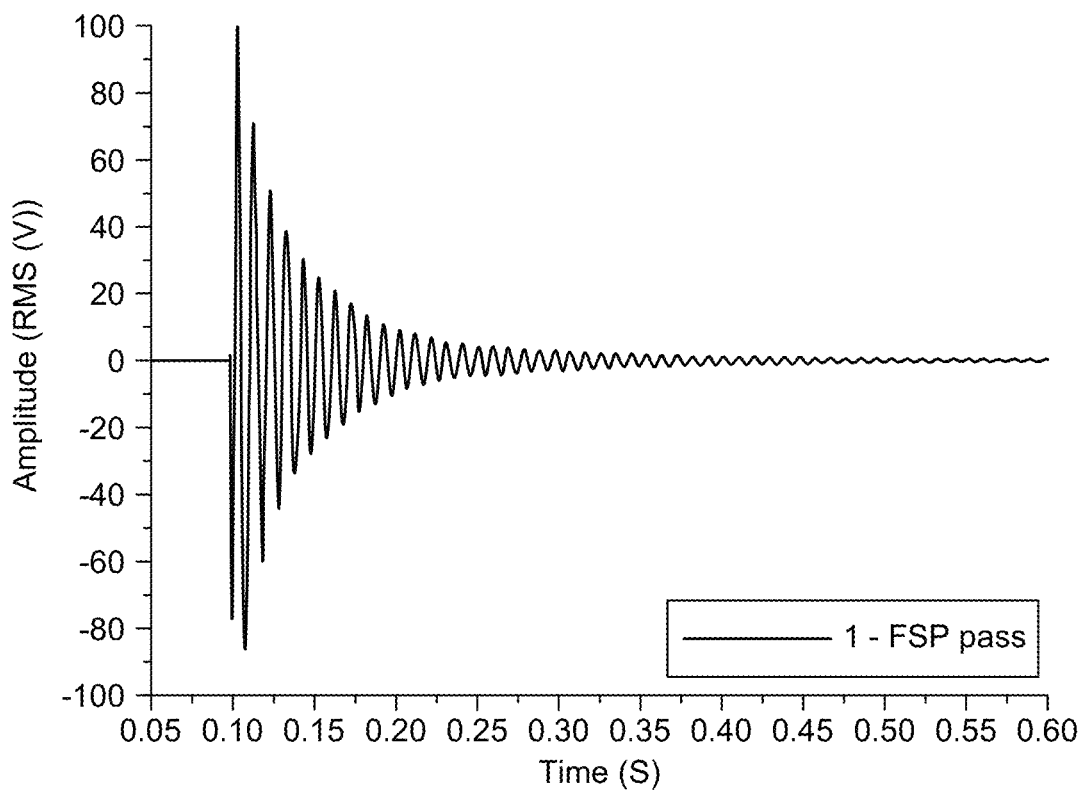
Figure 6C:
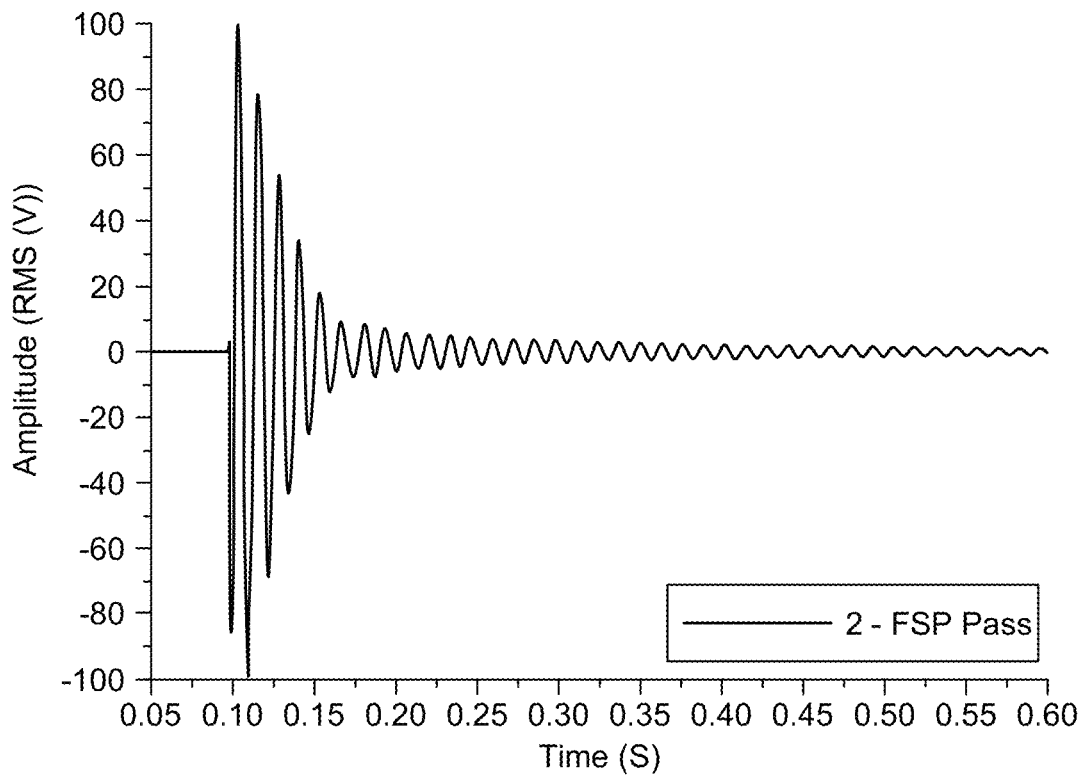
Figure 6D:
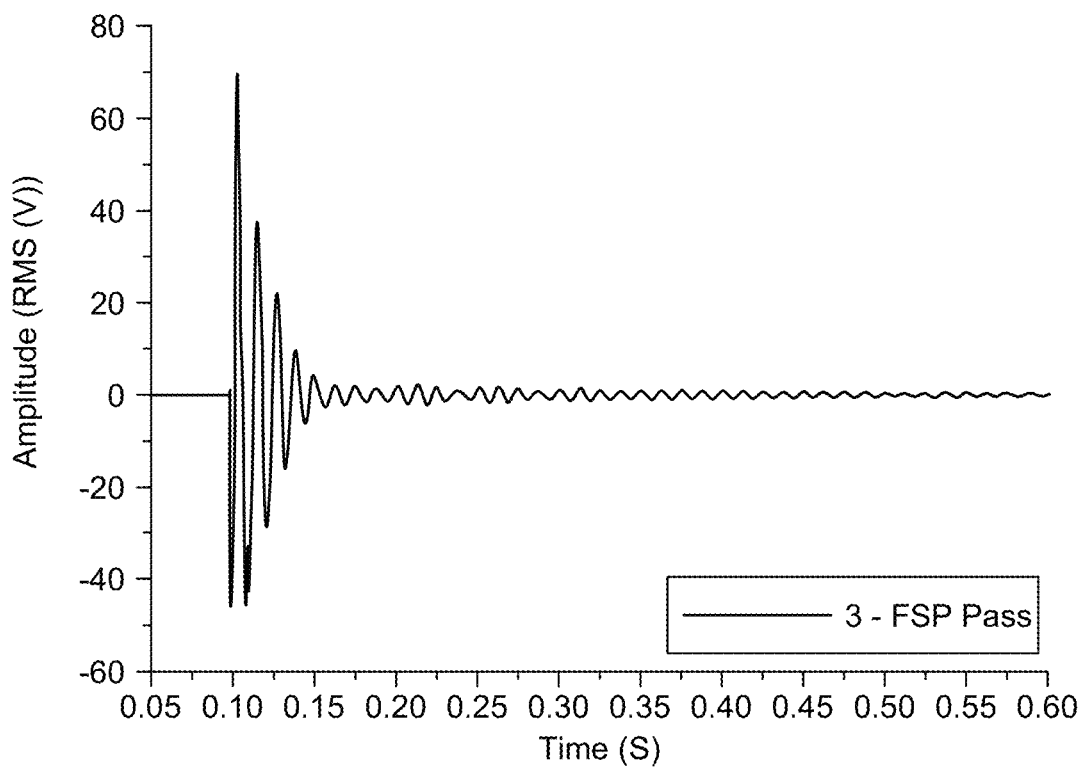

A refining activity is the process of reducing grains size several times resulting in fine grain size which enhances mechanical properties of a metal or an alloy. The presence of the reinforcing metal oxide nanoparticles improved the refining activity in the SZ. Hence, the SZ of the vibration-damped aluminum article showed the DRX. Therefore, reinforcement with the metal oxide nanoparticles restricted growth of other grains undergoing the FSP beyond the DRX. Refined equiaxed grains were obtained in the SZ after one pass of FSP (FIG. 5B). Further advanced refinement was achieved as the multi-pass FSP was carried out on the aluminum substrate (FIGS. 5C-5D).

Example 6

Vibration Amplitude Decay

Referring to FIGS. 6A-6D, graphical representations of decay times of the aluminum substrate and the vibration-damped aluminum article with the first pass, the second pass, and the third pass, respectively, of the fabrication process are illustrated. The multi-pass FSP, besides the reinforcement of nanoparticles, caused a significant improvement in a damping capacity. The increased grain boundaries and the refinement grain size caused by the metal oxide nanoparticles in the microstructure led to this significant improvement. The damping capacity is a mechanical property of materials which measure a material's ability to dissipate elastic strain energy during a mechanical vibration or a wave propagation. The decay time is 0.4 seconds for the aluminum substrate. The decay time is 0.3 seconds for the vibration-damped aluminum article 100 with the first pass. The second and third passes need half the time taken by the first pass. Hence, the decay times for the second and third passes are 0.15 seconds. Hence, the decay time for the vibration-damped aluminum article 100 decreases with increase in the number of the pass.

Figure 7A:
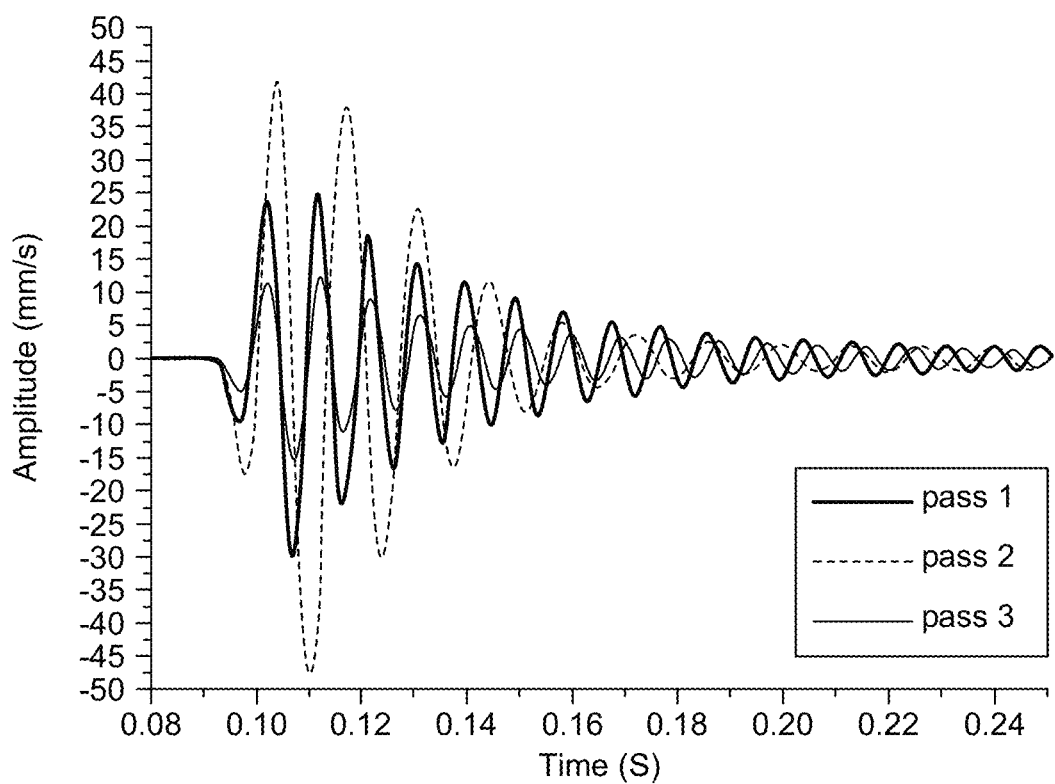
FIGS. 7A-7C are graphical representations of a multi-pass FSP carried out on a vibration-damped aluminum article made of an aluminum alloy AA 2024.
Figure 7B:
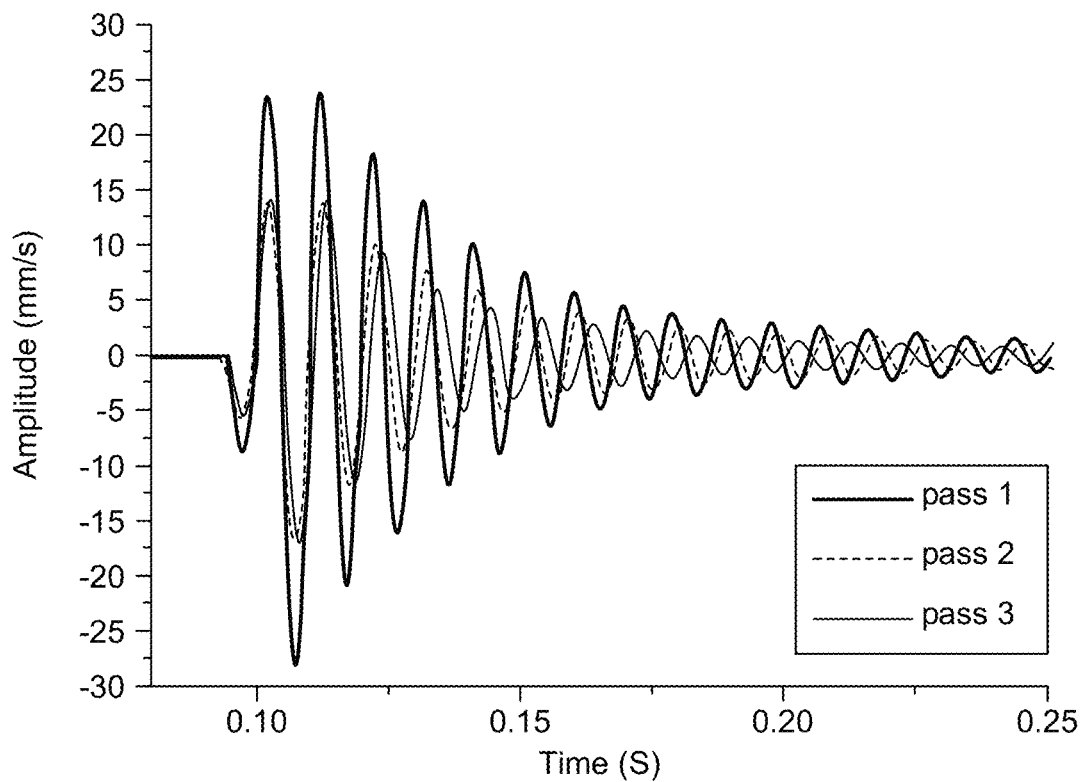
Figure 7C:
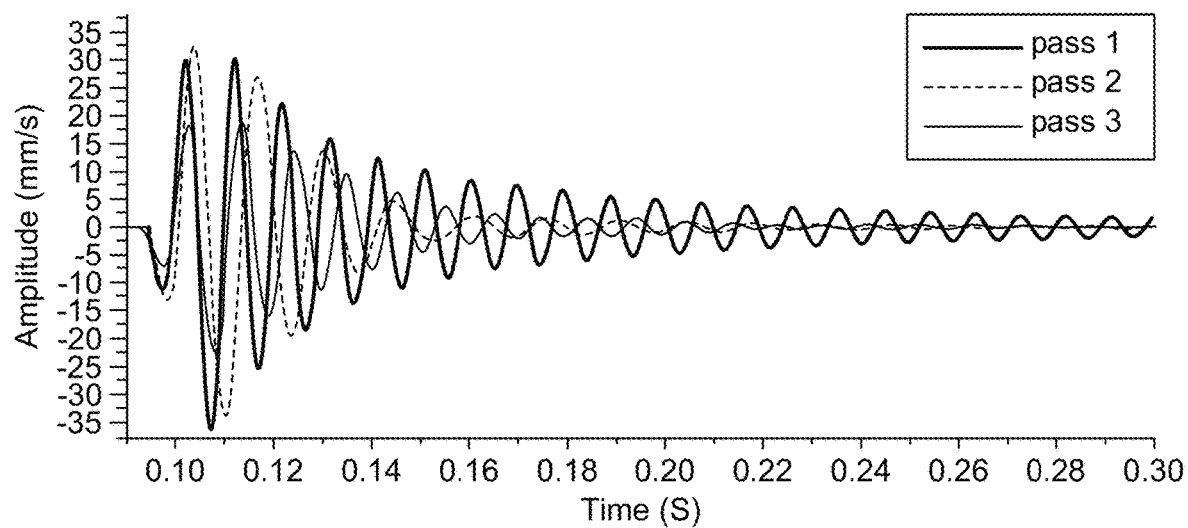
Figure 7C:
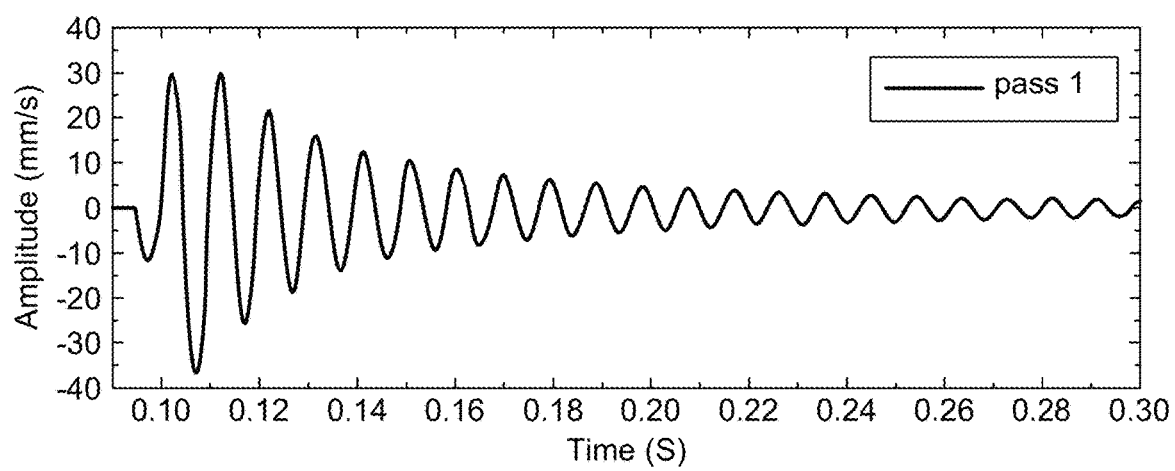
Figure 7C:
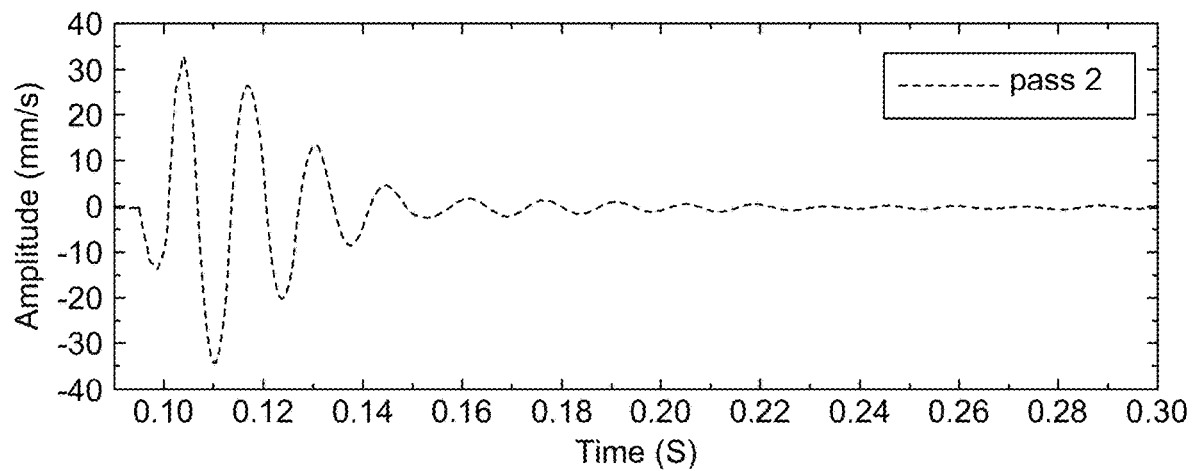
Figure 7C:
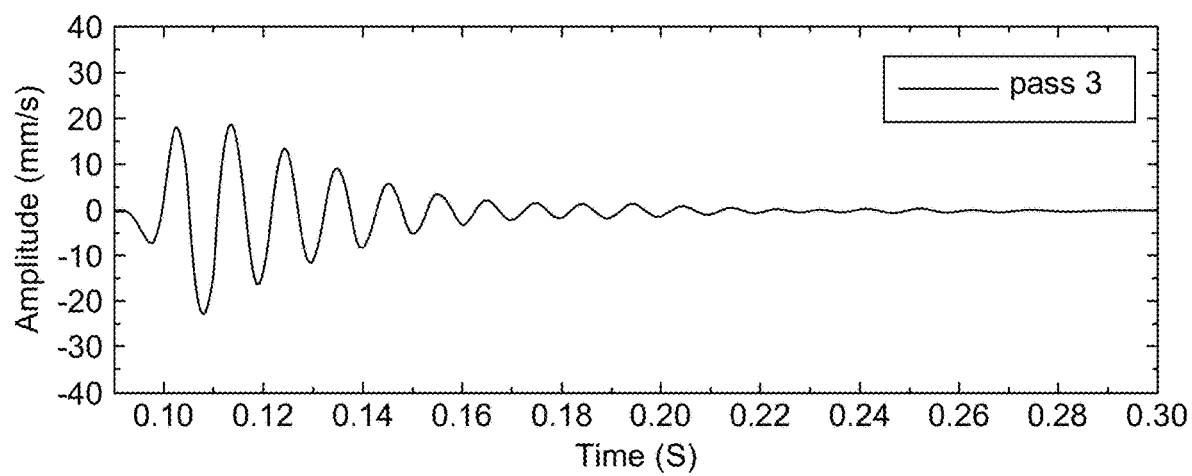

Referring to FIGS. 7A-7C, results of a multi-pass FSP carried out on the vibration-damped aluminum article 100 made up of AA2024 at 1400 rpm, 14 mm/min; 1100 rpm, 14 mm/min; 900 rpm, 14 mm/min are illustrated. The amplitude of the vibration-damped aluminum article 100 made up of AA2024 decreases with decrease in rotation speeds of the FSP tool 206. The amplitude of the vibration-damped aluminum article 100 made up of AA2024 decreases with the increase in the number of passes of the FSP.

Example 7

Damping Ratio

Figure 8:
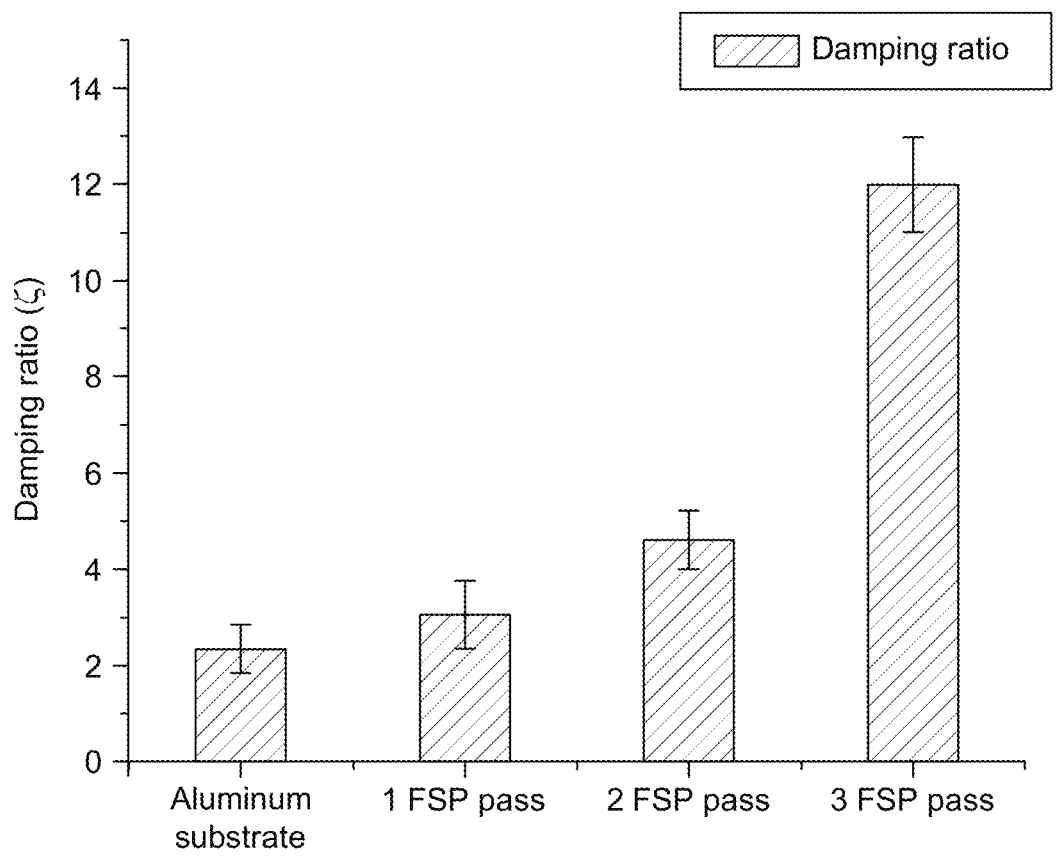
FIG. 8 is a graphical representation of damping ratios of the aluminum substrate and the vibration-damped aluminum article fabricated with the first pass, the second pass, and the third pass, respectively, of the fabrication process.

Referring to FIG. 8, a graphical representation of damping ratios of the aluminum substrate and the vibration-damped aluminum article fabricated with the first pass, the second pass, and the third pass, respectively, of the fabrication process is illustrated. The damping ratio is a dimensionless measure used to describe decomposition of oscillations within a system upon occurrence of a disturbance. The damping ratios for the aluminum substrate and the multi-pass FSP were approximately 2.3, 3.0, 4.6, and 12.0 respectively (see Table 1 below). The damping ratios increase by each pass of the FSP. A major difference is seen between damping ratios obtained by the third and second passes of the FSP. Further, the difference is greater than differences obtained between damping ratios obtained by the second and first passes; and the first pass and the aluminum substrate.

Referring to FIGS. 9A-9C, schematic views showing a wave signal transmitting through the aluminum substrate and the vibration-damped aluminum article are illustrated. The aluminum substrate had grains of larger dimensions with respect to the grains of the vibration-damped aluminum article. The grain refinement caused by the multi-pass FSP generated additional grain boundaries. The grain boundaries act as the blocking walls, the wave signal passing through the aluminum substrate and the vibration-damped aluminum articles made up of AA 7075 and AA 2024 were weakened resulting in a high damping behavior. Further, the presence of the metal oxide nanoparticles impaired the wave signal from a vibration source. The aluminum substrate included lower damping capacity (shown in tables 1 and 2) as compared to the vibration-damped aluminum article made up of AA 7075 and the vibration-damped aluminum article made up of AA 2024. The damping capacity increased more than five times the aluminum substrate by using the multi-pass FSP. Hence, the wave propagation in the grains inside the aluminum substrate was transmitted faster than the vibration-damped aluminum article.

Example 8

Dynamic Properties of Vibration Damped AA 7075

TABLE 1

| | Dynamic properties of the vibration-damped aluminum article 100 made up of AA 7075 at a rotation speed of 1080-rpm | | | | | |
|---|---|---|---|---|---|---|
| Rotation speed at 1080-rpm | Natural frequency (Hz) | Damping ratio (ζ) % | loss factor (η) | Storage modulus (E') | Loss modulus (E") | Pass number |
| Aluminum Substrate | 107 | 2.338 | 0.0467 | 63.77794 | 3.12813 | — |
| AA 7075 | 106 | 3.044 | 0.0608 | 62.46049 | 3.98813 | 1 |
| AA 7075 | 109 | 4.594 | 0.0918 | 65.61076 | 5.61216 | 2 |
| AA 7075 | 103 | 11.978 | 0.2394 | 61.05885 | 8.34257 | 3 |

Referring to table 1, the vibration-damped aluminum article 100 made up of AA 7075 had a natural frequency in a range of 103 to 109 Hz. The natural frequency is the frequency at which a system tends to oscillate in the absence of a driving or damping force. The vibration-damped aluminum article had a damping ratio of approximately 3.0 to 12.0%. The vibration-damped aluminum article had a loss factor of 0.06 to 0.30 and a loss modulus (E") of 4.0 to 9.0. The loss factor is a product of a dielectric constant of a capacitor dielectric by the alternating-current power factor. The loss modulus (E") is a measure of viscous response of a material and measures the energy dissipated as heat. The vibration-damped aluminum article had a storage modulus (E') of 61 to 66. The storage modulus indicates the capacity of a material to store input mechanical energy. The storage modulus decreases with the increase of temperature.

Example 9

Dynamic Properties of Vibration Damped AA 2024

TABLE 2

| | Dynamic properties of the vibration-damped aluminum article made up of AA 2024 at a rotation speed of 900-rpm | | | | | |
|---|---|---|---|---|---|---|
| Rotation speed at 900-rpm | Natural frequency (Hz) | Damping ratio (ζ) % | loss factor (η) | Storage modulus (E') | Loss modulus (E") | Pass number |
| Aluminum Substrate | 110 | 2.0154 | 0.040304 | 62.17943 | 3.26076 | — |
| AA 2024 | 108 | 2.94503 | 0.0589 | 60.97038 | 3.47693 | 1 |
| AA 2024 | 106 | 3.3313 | 0.06663 | 59.86324 | 4.20831 | 2 |
| AA 2024 | 107 | 4.80174 | 0.09603 | 60.85326 | 5.17179 | 3 |

Referring to table 2, the vibration-damped aluminum article made up of AA 2024 had a natural frequency in a range of 106 to 108 Hz. The vibration-damped aluminum article had a damping ratio of 2.5 to 5.0%. The vibration-damped aluminum article had a loss factor of 0.05 to 0.09 and a loss modulus (E") of 3.0 to 6.0. The vibration-damped aluminum article had a storage modulus (E') of 59 to 61.

The invention claimed is:
1. A method of improving vibration damping in an aluminum article, the method comprising:
   forming a groove in a surface of an aluminum substrate, the groove having a groove depth which is less than 50% of a thickness of the aluminum substrate;
   placing metal oxide nanoparticles in the groove to form an unmixed composite; and
   friction stir processing the unmixed composite to form a vibration-damped aluminum article,
   wherein the friction stir processing comprises at least two passes over the unmixed composite,
   wherein the vibration-damped aluminum article comprises a surface nanocomposite portion and an aluminum alloy portion,
   wherein the metal oxide nanoparticles are substantially free of metal carbides, metal borides, and carbon nanomaterials,
   wherein the metal oxide nanoparticles are present in a range of from 0.5 to less than 10 vol %, based on a total volume of vibration-damped aluminum article,
   wherein the vibration-damped aluminum article has a damping ratio in a range of from 3.0 to 17.0%, and wherein the vibration-damped aluminum article has a loss factor in a range of from 0.06 to 0.30 and a loss modulus (E") in a range of from 4.0 to 9.0.

2. The method of claim 1, wherein the groove has a groove width in a range of from 75 to 125% of the groove depth.

3. The method of claim 1, wherein the aluminum substrate is constructed of an aluminum alloy selected from the group consisting of AA 7075, AA 2519, and AA 5083.

4. The method of claim 1, wherein the metal oxide nanoparticles are aluminum oxide nanoparticles having a mean particle size in a range of from 5 to 150 nm.

5. The method of claim 1, wherein the friction stir processing is performed at a rotation speed in a range of from 750 to 2000 rotations per minute (rpm) and a tool travel speed in a range of from 10 to 50 mm/min.

6. The method of claim 2, wherein the friction stir processing is performed with a friction stir processing tool having a shoulder diameter in a range of from 6 to 12 times the groove width, a pin diameter in a range of from 2 to 6 times the groove width, and a pin length in a range of from 2 to 6 times the groove depth.

7. The method of claim 1, further comprising closing the groove before friction stir processing, the closing forming a closed groove comprising an enclosed channel filled with the metal oxide nanoparticles.

8. The method of claim 7, wherein the closing comprises passing a pinless tool over the groove.

9. The method of claim 8, wherein the pinless tool has a pinless tool diameter in a range of from 6 to 12 times the groove width.

10. The method of claim 8, wherein the pinless tool is passed over the groove at a rotation speed in a range of from 750 to 2000 rpm and a tool travel speed in a range of from 10 to 50 mm/min.

11. The method of claim 1, wherein the surface nanocomposite portion comprises the metal oxide nanoparticles and substantially equiaxed aluminum alloy grains having a mean grain size in a range of from 1 to 20 μm.

12. The method of claim 1, wherein the surface nanocomposite portion comprises one or more nanocomposite regions which collectively forms 5 to 100% of a surface area of the vibration-damped aluminum article, each of which has a nanocomposite region thickness in a range of from 75 to 200% of the groove depth.

13. The method of claim 1, wherein the metal oxide nanoparticles are present in a range of from 1 to less than 10 vol %, based on the total volume of vibration-damped aluminum article.

14. The method of claim 1, wherein the vibration-damped aluminum article has a damping ratio in a range of from 8.0 to 15.5%.

15. The method of claim 1, wherein the vibration-damped aluminum article has a loss factor in a range of from 0.08 to 0.29 and a loss modulus (E") in a range of from 4.5 to 7.5.

16. The method of claim 1, wherein the surface nanocomposite portion comprises the metal oxide nanoparticles and substantially equiaxed aluminum alloy grains having a mean grain size in a range of from 1 to 10 μm.

17. The method of claim 1, wherein the metal oxide nanoparticles have a mean particle size of 15 to 75 nm.

18. The method of claim 1, wherein the aluminum substrate comprises an AA 7075 aluminum alloy.

19. The method of claim 1, wherein the aluminum substrate comprises an AA 2519 aluminum alloy.

20. The method of claim 1, wherein the aluminum substrate comprises an AA 5083 aluminum alloy.

* * * * *